(12) United States Patent
Ogawa

(10) Patent No.: US 12,523,639 B2
(45) Date of Patent: Jan. 13, 2026

(54) ANALYSIS METHOD

(71) Applicant: KABUSHIKI KAISHA TOSHIBA, Tokyo (JP)

(72) Inventor: Kanako Ogawa, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 791 days.

(21) Appl. No.: 17/932,340

(22) Filed: Sep. 15, 2022

(65) Prior Publication Data
US 2023/0091706 A1 Mar. 23, 2023

(30) Foreign Application Priority Data

Sep. 17, 2021 (JP) .................................. 2021-151836
Jun. 6, 2022 (JP) .................................. 2022-091357

(51) Int. Cl.
B01L 3/00 (2006.01)
B01F 33/302 (2022.01)
B01F 33/3033 (2022.01)
B01L 7/00 (2006.01)
B01L 9/00 (2006.01)
B23D 63/00 (2006.01)
B29C 37/00 (2006.01)
B65G 47/80 (2006.01)
B82Y 20/00 (2011.01)
B82Y 30/00 (2011.01)
B82Y 40/00 (2011.01)
(Continued)

(52) U.S. Cl.
CPC ............. *G01N 30/95* (2013.01); *G01N 30/06* (2013.01); *G01N 30/74* (2013.01); *G01N 30/90* (2013.01); *G01N 33/52* (2013.01); *G01N 33/525* (2013.01)

(58) Field of Classification Search
CPC ........ G01N 30/95; G01N 30/06; G01N 30/74; G01N 30/90; G01N 33/52; G01N 33/525; G01N 31/22
See application file for complete search history.

(56) References Cited

U.S. PATENT DOCUMENTS 4,133,752 A * 1/1979 Kurane .................... C12N 1/20
435/262
2011/0032525 A1 2/2011 Kurokawa et al.
2022/0074902 A1 3/2022 Kudo

FOREIGN PATENT DOCUMENTS

JP WO 2009/128205 A1 10/2009
JP 2012-233774 A 11/2012
(Continued)

OTHER PUBLICATIONS

G. Engelhardt et al., "Metabolism of Di- and Mono-n-Butyl Phthalate by Soil Bacteria", Applied and Environmental Microbiology, vol. 35, No. 2, XP-002421836, Feb. 1978, pp. 243-246.

*Primary Examiner* — Jennifer Wecker
*Assistant Examiner* — Oyeleye Alexander Alabi
(74) *Attorney, Agent, or Firm* — Oblon, McClelland, Maier & Neustadt, L.L.P.

(57) ABSTRACT

According to one embodiment, an analysis method includes a first analysis and a second analysis. The first analysis detects a presence or absence of phthalates in a sample by irradiating ultraviolet light on a plate. The sample is developed on the plate by thin-layer chromatography. The second analysis detects a presence or absence of butyl benzyl phthalate in the sample by supplying a color reagent to the plate on which the sample is developed.

9 Claims, 14 Drawing Sheets

(51) Int. Cl.

| | | |
|---|---|---|
| *C07K 1/30* | (2006.01) |
| *C12M 1/26* | (2006.01) |
| *C12M 1/34* | (2006.01) |
| *C12M 3/06* | (2006.01) |
| *C12N 1/14* | (2006.01) |
| *C12N 1/20* | (2006.01) |
| *C12Q 1/02* | (2006.01) |
| *C12Q 1/6806* | (2018.01) |
| *C12Q 1/6844* | (2018.01) |
| *C12Q 1/6848* | (2018.01) |
| *C12Q 1/686* | (2018.01) |
| *C23C 2/00* | (2006.01) |
| *G01N 15/10* | (2024.01) |
| *G01N 15/14* | (2024.01) |
| *G01N 15/1433* | (2024.01) |
| *G01N 21/29* | (2006.01) |
| *G01N 21/41* | (2006.01) |
| *G01N 21/45* | (2006.01) |
| *G01N 21/64* | (2006.01) |
| *G01N 21/65* | (2006.01) |
| *G01N 30/06* | (2006.01) |
| *G01N 30/74* | (2006.01) |
| *G01N 30/90* | (2006.01) |
| *G01N 30/95* | (2006.01) |
| *G01N 33/52* | (2006.01) |
| *G01N 33/543* | (2006.01) |
| *G01N 33/574* | (2006.01) |
| *G01N 33/58* | (2006.01) |
| *G01N 33/68* | (2006.01) |
| *G01N 33/94* | (2006.01) |
| *G02B 6/42* | (2006.01) |

(56) References Cited

FOREIGN PATENT DOCUMENTS

| | | |
|---|---|---|
| JP | 2016-200531 A | 12/2016 |
| JP | 2019197006 A * | 11/2019 |
| JP | 2020-41927 A | 3/2020 |
| JP | 2021-196325 A | 12/2021 |
| WO | WO 2020/152800 A1 | 7/2020 |

* cited by examiner

| COMPOUND NAME | ABBREVIATION | Rf VALUE | RESTRICTED |
|---|---|---|---|
| DIBUTYL PHTHALATE | DBP | 0.75 | RoHS RESTRICTED |
| BUTYL BENZYL PHTHALATE | BBP | 0.80 | RoHS RESTRICTED |
| DI-2-ETHYLHEXYL PHTHALATE | DEHP | 0.42 | RoHS RESTRICTED |
| DIISOBUTYL PHTHALATE | DIBP | 0.76 | RoHS RESTRICTED |
| DIISONONYL PHTHALATE | DINP | 0.33 | NON-RESTRICTED |
| DIISODECYL PHTHALATE | DIDP | 0.27 | NON-RESTRICTED |
| DI-N-OCTYL PHTHALATE | DNOP | 0.37 | NON-RESTRICTED |
| DICYCLOHEXYL PHTHALATE | DCHP | 0.62 | NON-RESTRICTED |
| DIMETHYL PHTHALATE | DMP | 0.89 | NON-RESTRICTED |
| DIETHYL PHTHALATE | DEP | 0.86 | NON-RESTRICTED |
| BIS(2-ETHYLHEXYL)ISOPHTHALATE | DOIP | 0.28 | NON-RESTRICTED |
| BIS(2-ETHYLHEXYL)TEREPHTHALATE | DOTP | 0.27 | NON-RESTRICTED |
| TRIS(2-ETHYLHEXYL)TRIMELLITATE | TOTM | 0.18 | ALTERNATIVE COMPOUND OTHER THAN PHTHALATE |
| BIS(2-ETHYLHEXYL)ADIPATE | DOA | — | ALTERNATIVE COMPOUND OTHER THAN PHTHALATE |

| PLATE | DEVELOPING SOLVENT | DETECTION METHOD | SAMPLE 4 BBP | SAMPLE 4 DBP | SAMPLE 4 DIBP | DEHP | SAMPLE 5 BBP | SAMPLE 5 DBP | SAMPLE 5 DIBP |
|---|---|---|---|---|---|---|---|---|---|
|  |  |  | NONE | NONE | NONE | INCLUDED | NONE | NONE | NONE |
| REVERSED PHASE | ACETONITRILE | UV | DETECTED | ND | ND | DETECTED | DETECTED | ND | ND |
| REVERSED PHASE | ACETONITRILE | COLORING | ND | ND | ND | DETECTED | ND | ND | ND |
| REVERSED PHASE | METHANOL | UV | DETECTED | ND | ND | DETECTED (SEPARATED) | DETECTED | ND | ND |
| REVERSED PHASE | METHANOL | COLORING | ND | ND | ND | DETECTED | ND | ND | ND |
| NORMAL PHASE | ETHYL ACETATE + HEXANE (1:5) | UV | ND | ND | ND | DETECTED | ND | ND | ND |
| NORMAL PHASE | ETHYL ACETATE + HEXANE (1:5) | COLORING | ND | ND | ND | DETECTED | ND | ND | ND |
| REVERSED PHASE | ACETONITRILE + METHANOL (1:1) | UV | DETECTED | ND | ND | DETECTED | DETECTED | ND | ND |
| REVERSED PHASE | ACETONITRILE + METHANOL (1:5) | UV | DETECTED | ND | ND | DETECTED (SEPARATED) | DETECTED | ND | ND |
| REVERSED PHASE | ACETONITRILE + METHANOL (5:1) | UV | DETECTED | ND | ND | DETECTED | DETECTED | ND | ND |
| REVERSED PHASE | ACETONITRILE + METHANOL (1:1) | COLORING | DETECTED | ND | ND | DETECTED | ND | ND | ND |
| REVERSED PHASE | ACETONITRILE + METHANOL (1:5) | COLORING | DETECTED | ND | ND | DETECTED | ND | ND | ND |
| REVERSED PHASE | ACETONITRILE + METHANOL (5:1) | COLORING | ND | ND | ND | DETECTED | ND | ND | ND |

FIG. 11

| PLATE | DEVELOPING SOLVENT | DETECTION METHOD | SAMPLE 6 | | | | SAMPLE 7 | | | |
|---|---|---|---|---|---|---|---|---|---|---|
| | | | BBP | DBP | DiBP | DEHP | BBP | DBP | DiBP | DEHP |
| REVERSED PHASE | ACETONITRILE | UV | NONE | NONE | NONE | NONE | NONE | NONE | NONE | NONE |
| | | COLORING | DETECTED | ND | ND | ND | DETECTED | DETECTED | DETECTED | ND |
| | METHANOL | UV | ND | | | | | ND | ND | |
| | | COLORING | ND | | | | | – | – | |
| NORMAL PHASE | ETHYL ACETATE + HEXANE (1:5) | UV | ND | | | | | ND | ND | |
| | ACETONITRILE + METHANOL (1:1) | COLORING | DETECTED | | | | | – | – | |
| REVERSED PHASE | ACETONITRILE + METHANOL (1:5) | UV | DETECTED | | | | | ND | ND | |
| | ACETONITRILE + METHANOL (5:1) | | DETECTED | | | | | ND | ND | |
| | ACETONITRILE + METHANOL (1:1) | COLORING | ND | | | | | – | – | |
| | ACETONITRILE + METHANOL (1:5) | | ND | | | | | – | – | |
| | ACETONITRILE + METHANOL (5:1) | | ND | | | | | – | – | |

FIG. 12

| FIRST | DETECTED COMPONENT | SECOND | THIRD |
|---|---|---|---|
| ACETONITRILE / REVERSED PHASE / UV | BBP | ACETONITRILE / REVERSED PHASE / COLORING | 1. METHANOL / REVERSED PHASE / UV<br>2. ETHYL ACETATE + HEXANE / NORMAL PHASE / UV |
| | | 1. METHANOL / REVERSED PHASE / UV<br>2. ETHYL ACETATE + HEXANE / NORMAL PHASE / UV | 1. METHANOL / REVERSED PHASE / COLORING<br>2. ETHYL ACETATE + HEXANE / NORMAL PHASE / COLORING |
| | DBP / DIBP | 1. METHANOL / REVERSED PHASE / UV<br>2. ETHYL ACETATE + HEXANE / NORMAL PHASE / UV | |
| | DEHP | METHANOL / REVERSED PHASE / UV | |

FIG. 14

ANALYSIS METHOD

CROSS-REFERENCE TO RELATED APPLICATIONS

This application is based upon and claims the benefit of priority from Japanese Patent Application No. 2021-151836, filed on Sep. 17, 2021; and Japanese Patent Application No. 2022-091357, filed on Jun. 6, 2022; the entire contents of which are incorporated herein by reference.

FIELD

Embodiments described herein relate generally to an analysis method.

BACKGROUND

Plasticizers are used in resin materials or rubber materials of electrical products and the like. In plasticizers, four types of phthalates are restricted in the directive on the restriction of the use of certain hazardous substances in electrical and electronic equipment (RoHS) effective from July 2019. Technology that can more easily and accurately determine a plasticizer to be free of the restricted phthalates is desirable.

BRIEF DESCRIPTION OF THE DRAWINGS

FIG. 4 is a table showing Rf values of phthalates and alternative compounds;
FIG. 7 is a photograph showing results of the first analysis of the first example;
FIG. 11 is a table showing analysis results of the second example;
FIG. 12 is a table showing analysis results of the second example;
FIG. 14 illustrates a favorable analysis method.

DETAILED DESCRIPTION

Figure 1:
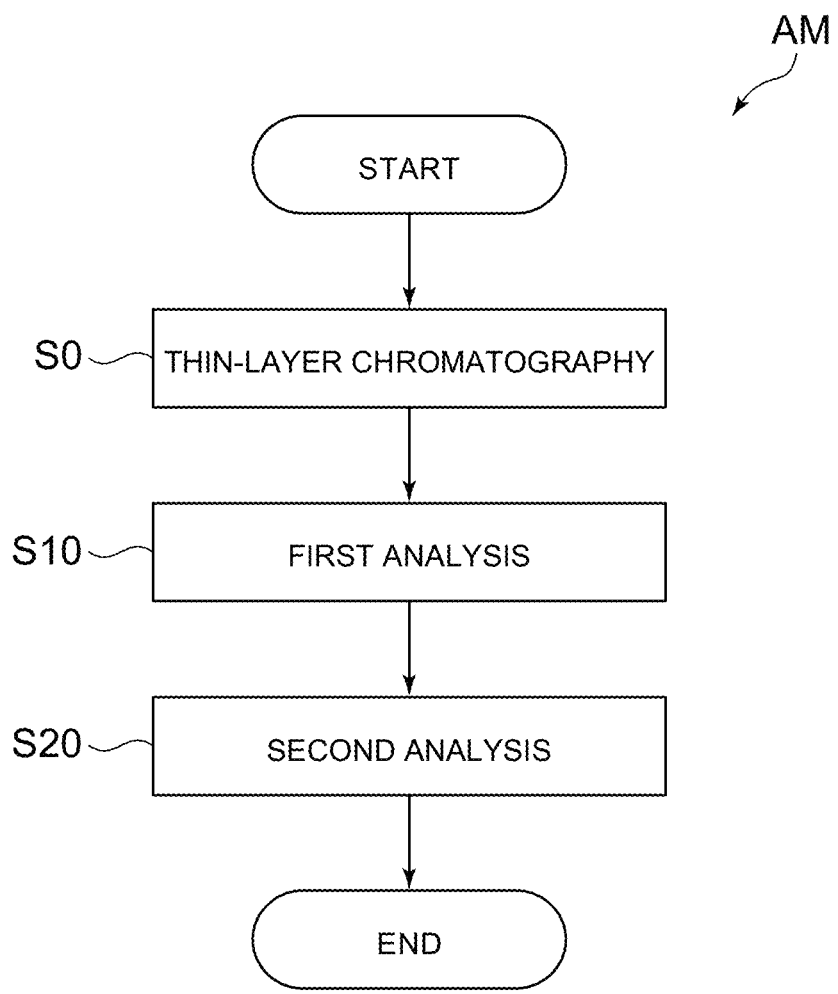
FIG. 1 is a flowchart showing an analysis method according to a first embodiment.

According to one embodiment, an analysis method includes a first analysis and a second analysis. The first analysis detects a presence or absence of phthalates in a sample by irradiating ultraviolet light on a plate. The sample is developed on the plate by thin-layer chromatography. The second analysis detects a presence or absence of butyl benzyl phthalate in the sample by supplying a color reagent to the plate on which the sample is developed.

Various embodiments are described below with reference to the accompanying drawings. In the specification and drawings, components similar to those described previously or illustrated in an antecedent drawing are marked with like reference numerals, and a detailed description is omitted as appropriate.

First Embodiment

FIG. 1 is a flowchart showing an analysis method according to a first embodiment.

The analysis method according to the first embodiment is used to analyze phthalates included in a resin material or a rubber material. As shown in FIG. 1, the analysis method AM according to the first embodiment includes thin-layer chromatography (step S0), a first analysis (step S10), and a second analysis (step S20).

In the thin-layer chromatography, a sample is made from the analyte; and the sample is developed on a plate. In the first analysis, ultraviolet light is irradiated on the plate on which the sample is developed. The presence or absence of phthalates in the sample is analyzed thereby. In the second analysis, a color reagent is supplied to the plate on which the sample is developed. Presence or absence of butyl benzyl phthalate in the sample is analyzed thereby. By using these two analyses, the absence of phthalates in the resin or rubber material can be verified with higher accuracy.

The analysis method according to the first embodiment will now be elaborated.

Analyte

The object of analysis is a resin material or a rubber material included in an electrical product, etc. The resin or rubber material includes a plasticizer. In the analysis method according to embodiments of the inventions of the application, the absence of phthalates in the plasticizer is verified. The object may include additives such as lubricants, etc., in addition to the plasticizer, resin, and rubber.

Resin material refers to a material in which not less than 50 wt % of the object is a resin. The resin that is included in the resin material is not particularly limited. The resin that is included in the resin material is, for example, polyvinyl chloride, polyethylene, polypropylene, polyester, polyurethane, polyvinyl acetate, an acrylic resin, an epoxy resin, nitrocellulose, etc.

Rubber material refers to a material in which not less than 50 wt % of the object is rubber. The rubber that is included in the rubber material is not particularly limited. The rubber that is included in the rubber material is, for example, nitrile butadiene rubber, chloroprene rubber, etc.

The plasticizer is a phthalate or substitute material. For example, the plasticizer is at least one selected from the group consisting of butyl benzyl phthalate (BBP), dibutyl phthalate (DBP), diisobutyl phthalate (DIBP), di-2-ethylhexyl phthalate (DEHP), diisononyl phthalate (DINP), diisodecyl phthalate (DIDP), di-n-octyl phthalate (DNOP), dicyclohexyl phthalate (DCHP), dimethyl phthalate (DMP), diethyl phthalate (DEP), bis-2-ethylhexyl isophthalate (DOIP), tris-2-ethylhexyl terephthalate (DOTP), tris-2-ethylhexyl trimellitate (TOTM), and bis-2-ethylhexyl adipate (DOA).

Among the plasticizers, phthalates include butyl benzyl phthalate, dibutyl phthalate, diisobutyl phthalate, di-2-ethylhexyl phthalate, diisononyl phthalate, diisodecyl phthalate, di-n-octyl phthalate, dicyclohexyl phthalate, dimethyl phthalate, diethyl phthalate, bis-2-ethylhexyl isophthalate, and tris-2-ethylhexyl terephthalate.

Trimellitic acids and adipic acids are alternative compounds of phthalates. Trimellitic acids include, for example, tris-2-ethylhexyl trimellitate (TOTM), trinormal alkyl trimellitate, triisodecyl trimellitate, etc. Adipates include, for example, bis-2-ethylhexyl adipate (DOA), diisononyl adipate, diisodecyl adipate, etc.

Among phthalates, butyl benzyl phthalate, dibutyl phthalate, diisobutyl phthalate, and di-2-ethylhexyl phthalate are restricted by RoHS restrictions. For convenience of description herein, the restricted phthalates are called "restricted components".

The allowable concentration in RoHS restrictions is not more than 0.1 wt %. In the analysis method according to embodiments, it is favorable to be capable of detecting phthalates less than the upper limit of the allowable concentration. For example, phthalates that are not less than 0.07 wt % are detected. More favorably, phthalates that are not less than 0.05 wt % are detected.

Thin-Layer Chromatography

Figure 2:
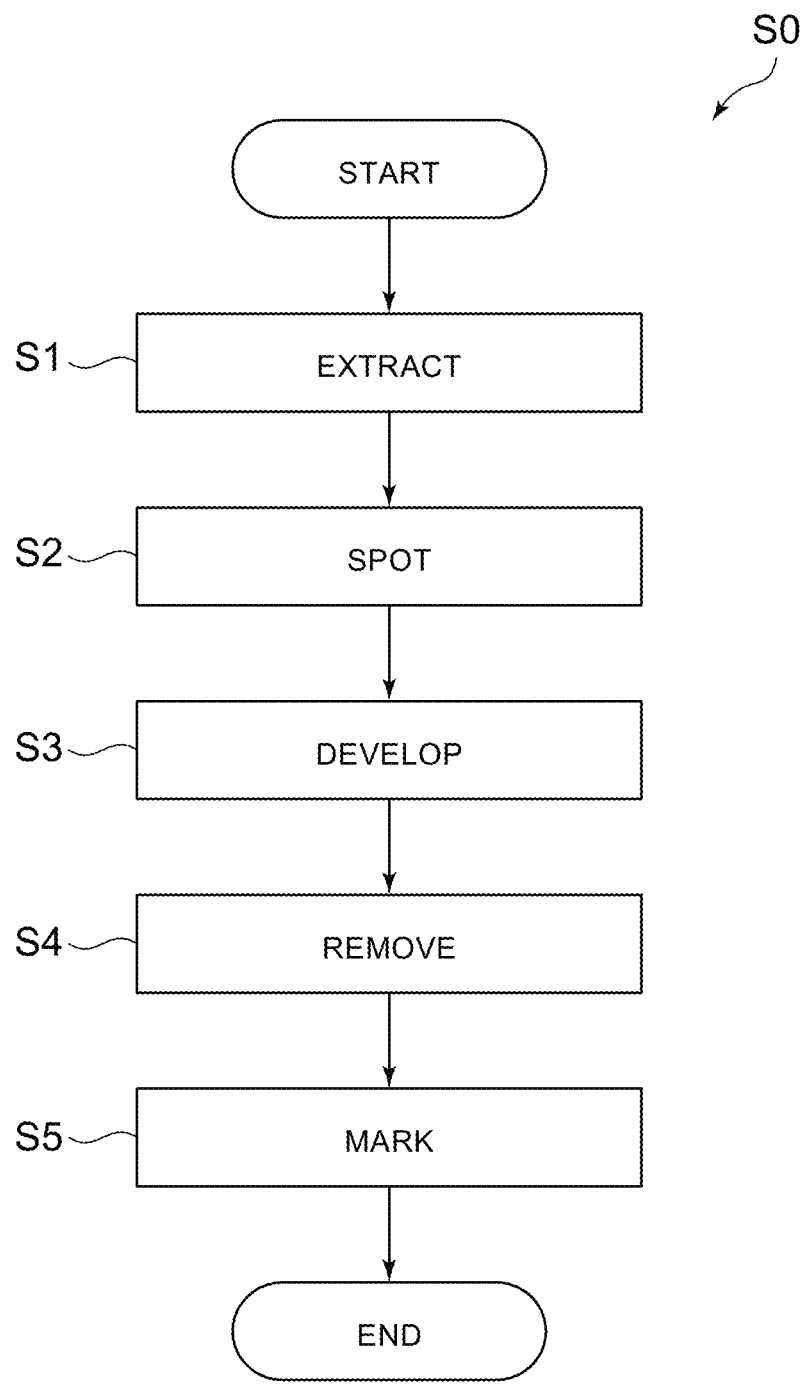
FIG. 2 is a flowchart showing a thin-layer chromatography procedure of the analysis method according to the first embodiment.

FIG. 2 is a flowchart showing a thin-layer chromatography procedure of the analysis method according to the first embodiment.

First, the plasticizer that is included in the resin or rubber material is extracted (step S1). Ethanol, acetone, toluene, hexane, isopropanol, or acetonitrile can be used as an extraction solvent for extracting the plasticizer. The plasticizer is extracted and dissolved in the solvent to obtain a solution (a sample).

It is favorable for the extraction solvent to be acetonitrile. Regardless of whether the object is a resin material or a rubber material, the amount of plasticizer necessary for the analysis can be extracted in a relatively short period of time by using acetonitrile. For example, by using acetonitrile, the plasticizer can be extracted in not less than 30 minutes and not more than 3 hours even when only a trace amount of phthalates is included. More desirably, the extraction time is not less than 1 hour and not more than 2 hours. Although the extraction solvent may include a solvent other than acetonitrile, it is favorable for the extraction solvent to be 100% acetonitrile.

To increase the extraction efficiency, the resin or rubber material is broken into small pieces. It is favorable to shred or pulverize the resin or rubber material so that the longest side of the resin or rubber material is not more than 4 mm. When extracting the resin or rubber material, it is favorable for the ratio V (mL)/M (mg) of the extraction solvent volume V (mL) to the resin or rubber material mass M (mg) to be not less than 1/250 mL/mg and not more than 1/1000 mL/mg. It is favorable to perform the extraction in a sealed container to prevent volatilization of the solvent. It is favorable for the temperature of the extraction solvent to be within the range of 40° C. to 70° C. The extraction rate can be increased by raising the temperature of the extraction solvent. An ultrasonic wave may be irradiated when extracting. The extraction rate can be increased by irradiating the ultrasonic wave.

In the thin-layer chromatography, it is favorable to use a plate (a reversed-phase plate) for reversed-phase chromatography in which a column (stationary phase) of low polarity is used. Although the plasticizer can be analyzed using a plate for normal-phase chromatography in which a column (stationary phase) of high polarity is used, the analysis accuracy of phthalates can be increased by using a reversed-phase plate.

In the reversed-phase plate, it is favorable for a stationary phase of silica gel or the like to be layered on a support. Glass, an aluminum sheet, a plastic sheet, etc., are examples of the support. It is favorable for the silica gel to be chemically modified. It is favorable for the silica gel to be chemically modified with groups such as octadecyl ($C_{18}$), octyl ($C_8$), dimethylsilyl ($Si(CH_3)_2$), etc. When using acetonitrile to analyze phthalates, it is favorable for the silica gel to be chemically modified with an octadecyl group ($C_{18}$).

The solution that is obtained by extracting the plasticizer is spotted on the plate (step S2). The solution is adhered to the plate. It is favorable to spot small amounts of the solution multiple times so that a low concentration of the plasticizer in the resin or rubber material can be detected. For example, not less than 0.5 μL and not more than 1.5 μL of the solution is dropped in one spotting. Spotting may be performed multiple times. As an example, the plasticizer is extracted from a resin material or a rubber material that includes 0.07 wt % of a restricted component. In such a case, phthalates can be detected by spotting 1 μL of the solution not less than three times.

To analyze phthalates, it is favorable for the development distance due to the developing solvent (the mobile phase) to be not less than 5 cm. It is therefore favorable for the distance between the origin and the upper end of the plate to be greater than 5 cm. The analysis is easier as the development distance is increased, but the analysis time is longer. It is therefore favorable for the development distance to be less than 25 cm. More favorably, the development distance is less than 17 cm.

The spotted sample is developed on the plate by the developing solvent (step S3). Specifically, the plate to which the sample is adhered is placed inside a development tank containing the developing solvent. The lower end of the plate is immersed in the developing solvent. The sample is developed on the plate by the developing solvent. It is favorable for the vapor of the developing solvent to fill the development tank. The developing solvent includes at least one selected from the group consisting of acetonitrile, methanol, ethyl acetate, and hexane. Favorably, the developing solvent is substantially made of at least one selected from the group consisting of acetonitrile, methanol, ethyl acetate, and hexane. It is favorable for the developing solvent to be acetonitrile. The acetonitrile may include an additive for pH adjustment, etc. By using the same acetonitrile as the extraction solvent and the developing solvent, the convenience of the analysis can be improved, and the waste liquid can be efficiently processed.

When the development is completed, the plate is removed from the development tank (step S4). The front edge to which the developing solvent has moved is marked (step S5). The marking step can be omitted when the Rf value described below is calculated by analyzing an image. Thus, the plate on which the sample is developed is obtained. In the analysis method according to the first embodiment, the first analysis and the second analysis are performed using such plates.

First Analysis

Figure 3:
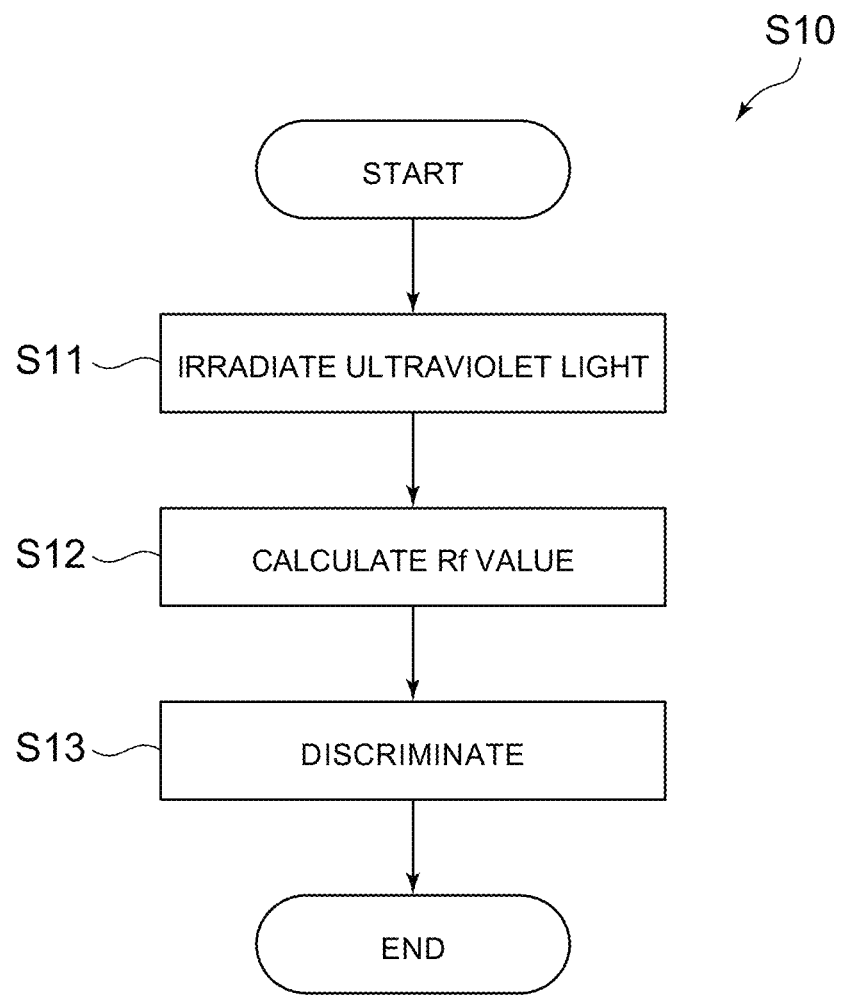
FIG. 3 is a flowchart showing the procedure of the first analysis of the analysis method according to the first embodiment.

FIG. 3 is a flowchart showing the procedure of the first analysis of the analysis method according to the first embodiment.

Ultraviolet light is irradiated on the plate on which the sample is developed by the thin-layer chromatography (step S11). The wavelength of the ultraviolet light is, for example, 254 nm. A fluorescent substance is added to the plate. The fluorescent substance emits light due to the irradiation of the ultraviolet light. When a conjugated compound or the like that absorbs the ultraviolet light is present, a spot that is darker than the other portions of the plate is observed.

The Rf value of each spot is calculated (step S12). Specifically, the dark spots that appear due to the irradiation of the ultraviolet light are marked. A distance A from the origin to the mark of the spot is measured. A development distance B from the origin to the mark of the developing solvent front is measured. Using the distance A and the development distance B, the Rf value is represented by A/B. The Rf value may be calculated based on results of the naked eye or by image processing software.

FIG. 4 is a table showing Rf values of phthalates and alternative compounds.

The component of each spot is discriminated based on the Rf value (step S13). As shown in FIG. 4, each phthalate component has a specific Rf value. The component of each spot can be discriminated by comparing the Rf values calculated in step S12 with the known Rf values of the phthalate components.

The component discrimination will now be described more specifically. The Rf value of the restricted component shown in FIG. 4 is taken as Rfn. The Rf value of the restricted component (Rfn) and the Rf value determined from the spot are determined to match when the Rf value determined from the spot is not less than 0.97Rfn and not more than 1.03Rfn. In other words, an error of ±3% is acceptable for the Rf value determined from the spot. The Rf value of the restricted component (Rfn) and the Rf value determined from the spot are determined not to match when the Rf value is less than 0.97Rfn or greater than 1.03Rfn. In other words, the sample is determined not to include the restricted component corresponding to the Rf value.

As described above, the restricted components are butyl benzyl phthalate, dibutyl phthalate, diisobutyl phthalate, and di-2-ethylhexyl phthalate. When the Rf value of a spot is greater than 0.41 and less than 0.43, the plasticizer is determined to possibly include di-2-ethylhexyl phthalate. When the Rf value of a spot is greater than 0.73 and less than 0.77, the plasticizer is determined to possibly include dibutyl phthalate. When the Rf value of a spot is greater than 0.74 and less than 0.78, the plasticizer is determined to possibly include diisobutyl phthalate. When the Rf value of a spot is greater than 0.78 and less than 0.82, the plasticizer is determined to possibly include butyl benzyl phthalate.

The first analysis is completed by the procedure described above. The first analysis determines whether or not there is a possibility that a restricted component may be present in the sample.

Second Analysis

Figure 5:
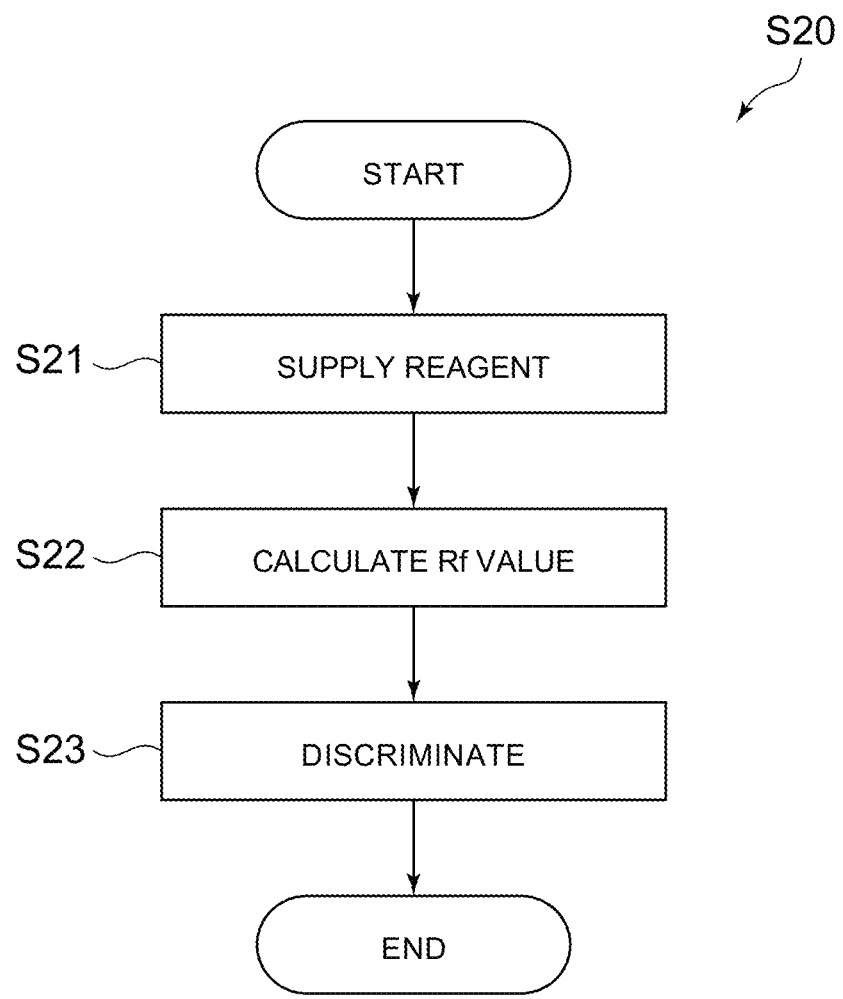
FIG. 5 is a flowchart showing the procedure of the second analysis of the analysis method according to the first embodiment.

FIG. 5 is a flowchart showing the procedure of the second analysis of the analysis method according to the first embodiment.

A color reagent (hereinafter called the "reagent") is supplied to the plate on which the sample is developed by the thin-layer chromatography (step S21). For example, the reagent is sprayed onto the plate. The plate may be immersed in the reagent. A chemical that colors butyl benzyl phthalate is used as the reagent. For example, phosphomolybdic acid ethanol, cerium-ammonium molybdate, vanillin ethanol, etc., can be used as the reagent. When phosphomolybdic acid ethanol is used as the reagent, among the restricted components, butyl benzyl phthalate and di-2-ethylhexyl phthalate can be colored. The plate may be heated to promote the reaction between the reagent and the components of the spots.

The Rf value of each colored spot are calculated (step S22). The component of each spot is discriminated based on the Rf value (step S23). The calculation of the Rf values and the discrimination of the components are performed similarly to steps S12 and S13 described above.

The second analysis is completed by the procedure described above. The reagent colors butyl benzyl phthalate. Therefore, the second analysis determines whether or not the plasticizer includes butyl benzyl phthalate. The second analysis may further detect other restricted phthalates. For example, when phosphomolybdic acid ethanol is used as the reagent, the second analysis detects butyl benzyl phthalate and di ethylhexyl phthalate.

The possibility that a restricted component is included in the plasticizer is determined using the analysis results when the first analysis is complete or when both the first and second analyses are completed. For example, restricted components are determined not to be included in the plasticizer when the Rf values of the spots do not match the Rf values of the phthalates in both the first and second analyses. When a restricted component is determined to possibly be included in the plasticizer based on the result of the first analysis or based on the results of both the first and second analyses, gas chromatography and mass spectrometry may be used to determine whether or not a restricted component is included in the plasticizer.

Advantages of the first embodiment will now be described.

It is desirable to be capable of easily analyzing whether or not a restricted component is included in the plasticizer. For example, analysis methods of the plasticizer include performing gas chromatography and mass spectrometry after Soxhlet extraction, performing gas chromatography and mass spectrometry after ultrasonic extraction, etc. However, expensive analysis devices are necessary for these methods. There are expectations for simpler analysis by analysis methods using thin-layer chromatography.

Simpler analysis methods include using thin-layer chromatography and ultraviolet light irradiation. Conventionally, it has been considered that such an analysis method can analyze the four restricted types of phthalates.

On the other hand, the inventor of the application performed the following experiments on analysis using thin-layer chromatography and ultraviolet light irradiation. Specifically, the inventor of the application performed analysis using thin-layer chromatography and ultraviolet light irradiation, and then analyzed the same samples with gas chromatography and mass spectrometry. As a result, it was confirmed that there are cases where butyl benzyl phthalate is not detected by gas chromatography and mass spectrometry in a sample for which butyl benzyl phthalate was detected by the analysis using thin-layer chromatography and ultraviolet light irradiation. Based on this result, it was found that according to the analysis using thin-layer chromatography and ultraviolet light irradiation, another component that has the same Rf value as butyl benzyl phthalate can be detected. In other words, when the Rf value of the spot is greater than 0.78 and less than 0.82 in the analysis using thin-layer chromatography and ultraviolet light irradiation, it cannot be discriminated whether the component of the spot is restricted butyl benzyl phthalate or another unrestricted component. It was found that conventional art has room for improvement in that a sample that does not include butyl benzyl phthalate may be determined to include butyl benzyl phthalate.

For this problem, the analysis method according to the first embodiment includes the first and second analyses. In the first analysis, phthalates are detected using ultraviolet light irradiation. In the second analysis, butyl benzyl phthalate is detected using a reagent. The reagent colors butyl benzyl phthalate. The reagent does not color at least a portion of at least one component having the same Rf value as butyl benzyl phthalate. Thereby, when the Rf value of the spot is greater than 0.78 and less than 0.82, it can be determined whether or not the component of the spot is highly likely to include butyl benzyl phthalate. According to the first embodiment, it can be determined more easily and with higher accuracy that a sample is free of restricted components (particularly, butyl benzyl phthalate).

In particular, analysis that uses thin-layer chromatography is favorable as primary screening in which it is desirable to test all samples because multiple samples can be simultaneously analyzed. The analysis method according to the first embodiment is favorable as a primary screening method of a wide variety of products because expensive devices and advanced technology are unnecessary. According to the first embodiment, the primary screening can be performed more easily and with higher accuracy.

Different plates may be used respectively in the first and second analyses. Favorably, the same one plate is used in the first and second analyses. The number of plates necessary for the analysis can be reduced thereby, and the samples can be more efficiently analyzed.

The second analysis may be performed before the first analysis or after the first analysis. Favorably, the second analysis is performed after the first analysis. According to the first analysis, the possibility that the four restricted types of phthalates are included in the sample can be determined. When none of the Rf values of the spots of the first analysis match the Rf values of the restricted components, the sample can be determined not to include a restricted component. In such a case, it is unnecessary to perform the second analysis.

Figure 6:
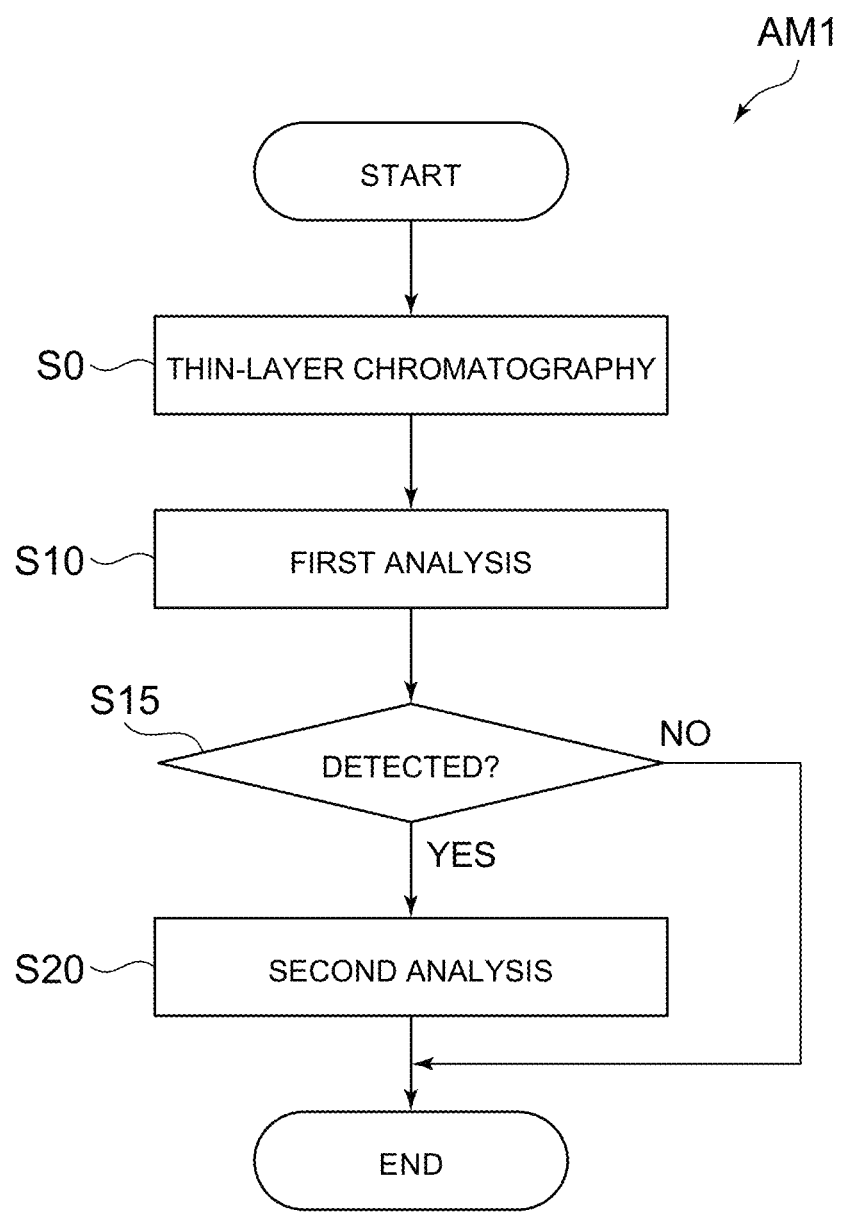
FIG. 6 is a flowchart showing a favorable procedure of an analysis method according to the first embodiment.

FIG. 6 is a flowchart showing a favorable procedure of an analysis method according to the first embodiment.

In the analysis method AM1, after the first analysis (step S10), it is determined whether or not a component having the same Rf value as butyl benzyl phthalate was detected in the first analysis (step S15). The analysis ends when a component having the same Rf value as butyl benzyl phthalate is not detected. In other words, the second analysis is not performed.

When dibutyl phthalate, diisobutyl phthalate, or di-2-ethylhexyl phthalate is detected in the first analysis, the sample is determined to possibly include a detected restricted component. When a component having the same Rf value as butyl benzyl phthalate is detected in the first analysis, the sample is determined to possibly include butyl benzyl phthalate. In such a case, the second analysis is performed. When none of the restricted components are detected in the first analysis, the sample is determined not to include a restricted component.

The second analysis is performed for the plate for which the first analysis was performed. When butyl benzyl phthalate is detected in the second analysis, the sample is determined to possibly include butyl benzyl phthalate. When butyl benzyl phthalate is not detected in the second analysis, the sample is determined not to include butyl benzyl phthalate.

First Example

The following procedure was used to prepare an acetonitrile solution (a sample S) that included 1 wt % each of the four types of restricted phthalates, and three types of samples 1 to 3 that did not include restricted substances. First, the analytes were shredded with scissors so that the long sides of the analytes each were not more than 4 mm. 250 mg of objects were placed in a 2 mL crimp vial. 0.5 mL of acetonitrile was added to the crimp vial, and the lid of the crimp vial was closed. The extraction solvent was heated to 60° C., and the plasticizer that was included in the object was extracted while irradiating an ultrasonic wave. The solution was obtained thereby. The extraction time of each plasticizer was 1 hour.

1 µL of the obtained sample S was spotted once onto a reversed-phase plate. For the samples 1 to 3, 1 µL was spotted on the reversed-phase plate three times. RP-18F254s made by Merck was used as a 5 cm×7.5 cm reversed-phase plate. The spotting was performed at an origin 5 mm from the lower end of the reversed-phase plate. Acetonitrile was placed in a development tank that can contain a 5 cm×7.5 cm plate therein. The interior of the development tank was filled with vaporized acetonitrile. At that time, the liquid surface level of the acetonitrile was about 2 mm. The reversed-phase plate was placed inside the development tank so that the lower end side of the reversed-phase plate was immersed in the acetonitrile. The spotted reversed-phase plate was removed from the development tank when the movement distance reached 6.5 cm.

254 nm ultraviolet light was irradiated on the removed reversed-phase plate. The plate was imaged using a digital camera under non-strobe conditions. The obtained image was analyzed using the thin-layer chromatography analysis software Just TLC to obtain the Rf value of each spot.

Figure 7:
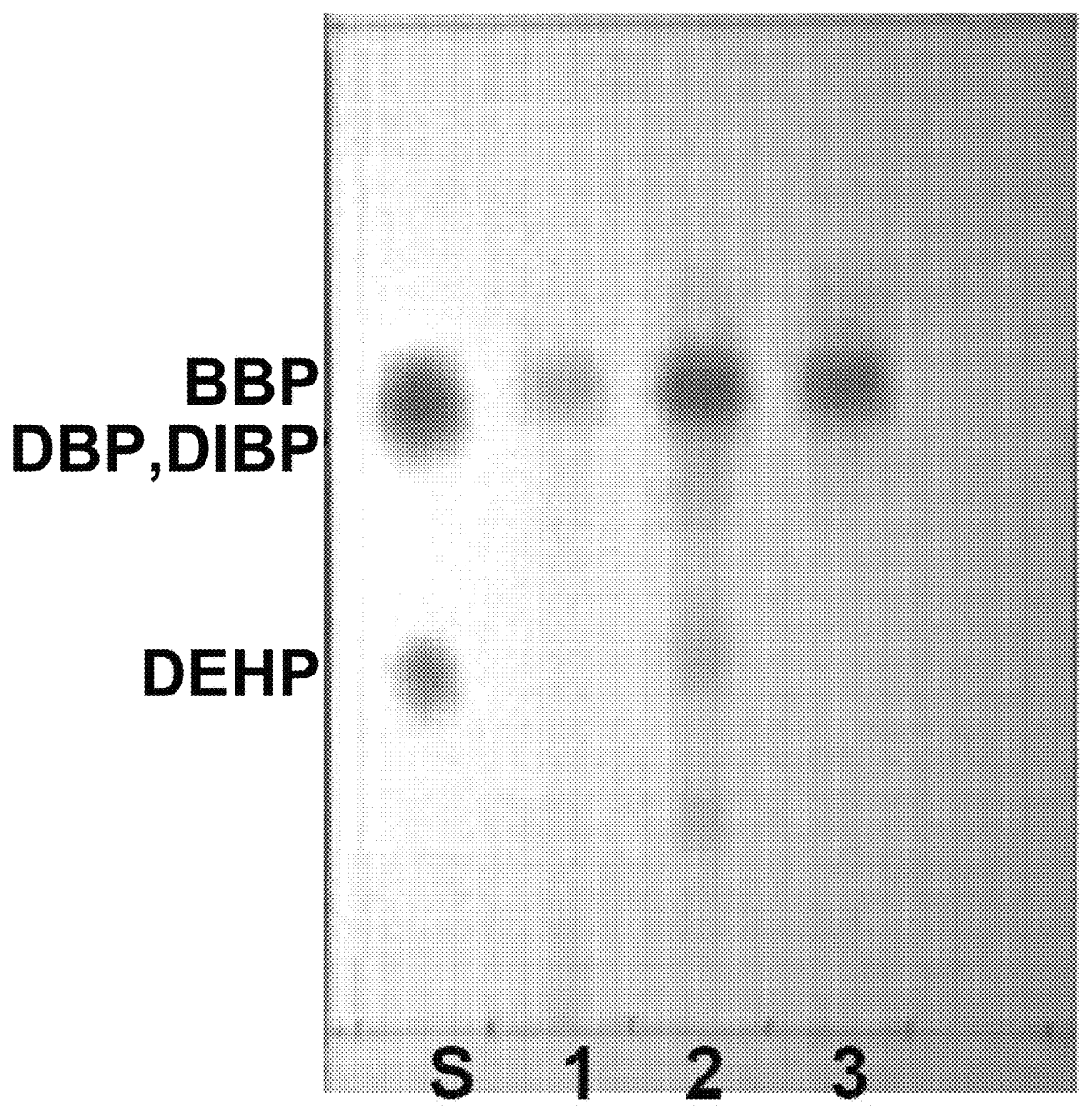

FIG. 7 is a photograph showing results of the first analysis of the first example.

In the photograph of FIG. 7, the four restricted types of phthalates (butyl benzyl phthalate, dibutyl phthalate, diisobutyl phthalate, and di-2-ethylhexyl phthalate) are detected in the sample S. Dibutyl phthalate, diisobutyl phthalate, and di ethylhexyl phthalate are not detected in the samples 1 to 3. However, spots appear at the Rf value of butyl benzyl phthalate in the samples 1 to 3 even though butyl benzyl phthalate is not included.

Phosphomolybdic acid ethanol was sprayed on the plate that had been irradiated with ultraviolet light. The plate was heated to about 120 degrees on a hotplate. The heating was stopped when the spots developed color. The plate was imaged with a digital camera under non-strobe conditions.

Figure 8:
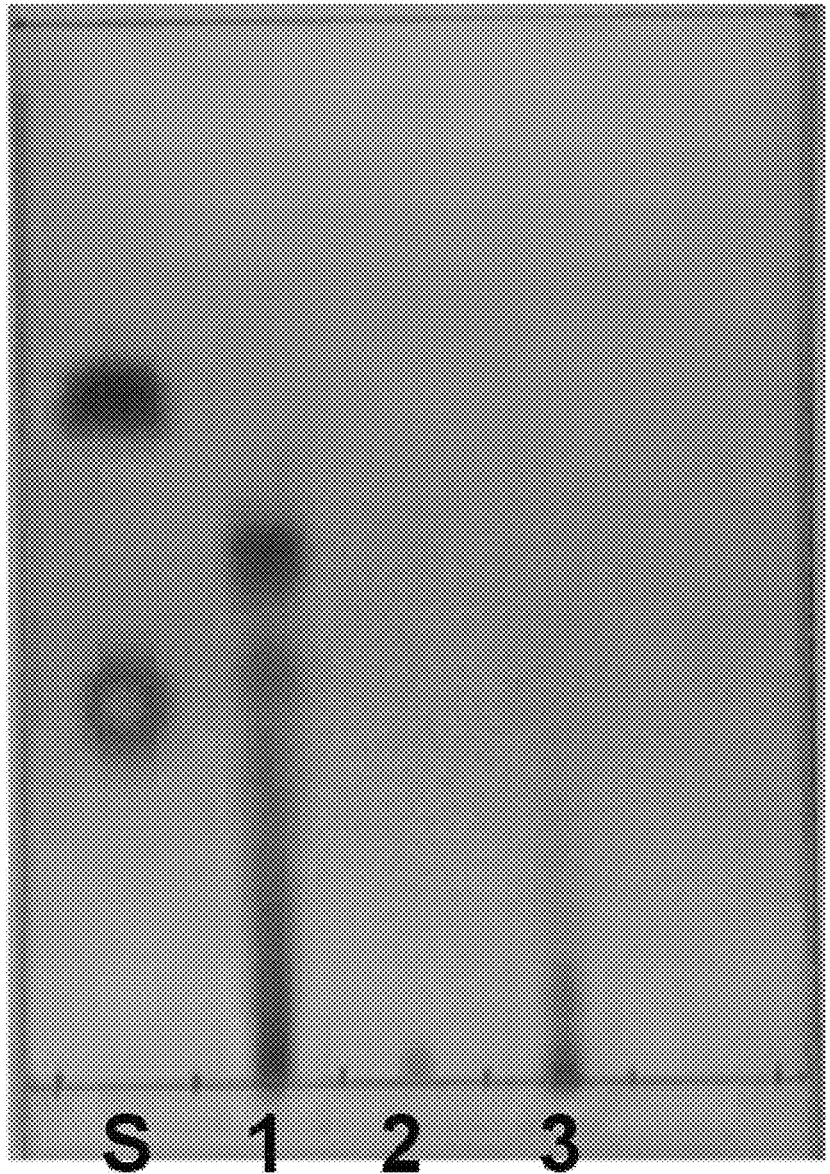
FIG. 8 is a photograph showing the results of the second analysis of the first example.

FIG. 8 is a photograph showing the results of the second analysis of the first example.

In the photograph of FIG. 8, it can be seen that butyl benzyl phthalate and di-2-ethylhexyl phthalate are colored in the sample S. On the other hand, in the samples 1 to 3, spots do not appear at the Rf values of the four types of phthalates. In the photograph of FIG. 8, it can be seen that butyl benzyl phthalate is colored by the reagent, while no other components are colored at the same Rf value as butyl benzyl phthalate. It can be confirmed thereby that the samples 1 to 3 do not include butyl benzyl phthalate.

Modification

Figure 9:
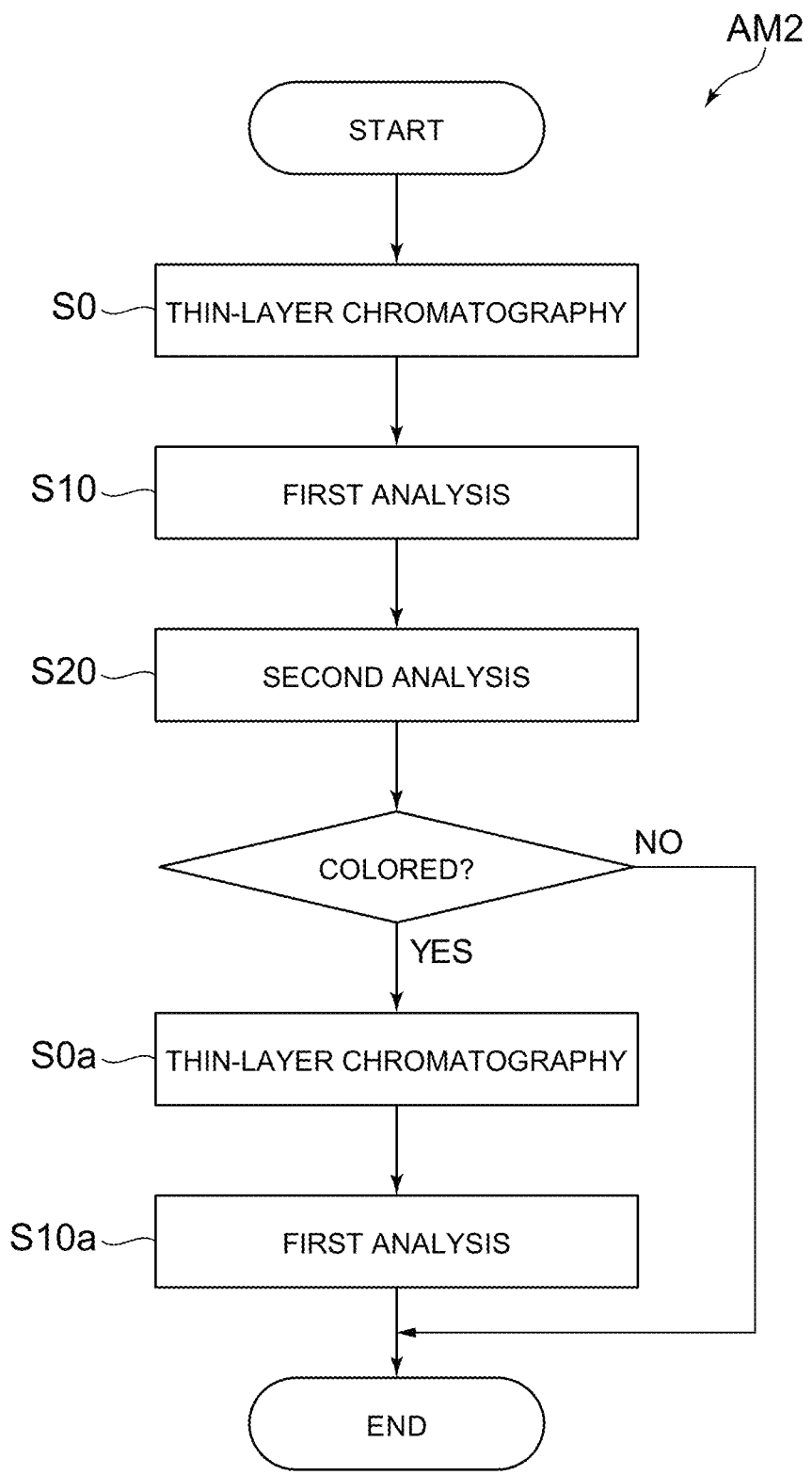
FIG. 9 is a flowchart showing an analysis method according to a modification of the first embodiment.

FIG. 9 is a flowchart showing an analysis method according to a modification of the first embodiment.

Compared to the analysis method AM, the analysis method AM2 according to the modification shown in FIG. 9 further includes thin-layer chromatography (step S0a) and a first analysis (step S10a). Hereinafter, the thin-layer chromatography of step S0 is called the initial thin-layer chromatography. The thin-layer chromatography of step S0a is called the additional thin-layer chromatography. The first analysis of step S10 is called the initial first analysis. The first analysis of step S10a is called the additional first analysis. The additional thin-layer chromatography and the additional first analysis are performed when a component having the same Rf value as a restricted phthalate is colored in the second analysis.

Similarly to the initial thin-layer chromatography, the additional thin-layer chromatography is performed according to the procedure shown in FIG. 2. The sample that is used in the initial thin-layer chromatography is used in the additional thin-layer chromatography. Another sample may be prepared in the additional thin-layer chromatography. However, the components of the sample developed in the additional thin-layer chromatography are the same as the components of the sample developed in the initial thin-layer chromatography.

A component of the developing solvent (a second developing solvent) used in the additional thin-layer chromatography is different from a component of the developing solvent (a first developing solvent) used in the initial thin-layer chromatography. For example, the first developing solvent includes at least one selected from the group consisting of acetonitrile, methanol, ethyl acetate, and hexane. The second developing solvent includes at least one other selected from the group.

The polarity of the plate (a second plate) used in the additional thin-layer chromatography may be different from the polarity of the plate (a first plate) used in the initial thin-layer chromatography. For example, the first plate is a reversed-phase plate of low polarity. The second plate is a normal-phase plate of high polarity.

Similarly to a first analysis S10, the additional first analysis is performed according to the procedure shown in FIG. 3. Based on the Rf values determined from the spots, it is determined whether or not the sample includes butyl benzyl phthalate. Specifically, the plasticizer is determined not to include butyl benzyl phthalate when the Rf values of the spots do not match the Rf value of butyl benzyl phthalate. The plasticizer is determined to possibly include butyl benzyl phthalate when the Rf value of a spot matches the Rf value of butyl benzyl phthalate.

As described above, by using the analysis method AM according to the first embodiment shown in FIG. 1, whether or not phthalates are included in the analyte can be analyzed more easily and with higher accuracy. On the other hand, after inventing the first embodiment, the inventor of the application obtained the following new knowledge by performing further experiments. When coloration of the sample was not confirmed in the second analysis, the results of the gas chromatography or mass spectrometry also could confirm that the sample was free of butyl benzyl phthalate. In many cases, when coloration of the sample was confirmed in the second analysis, the results of the gas chromatography or mass spectrometry also could confirm that the sample included butyl benzyl phthalate. However, in some cases, the gas chromatography or mass spectrometry could not detect butyl benzyl phthalate in the sample even though coloration of the sample was confirmed in the second analysis. The component that caused the coloration of the sample in the second analysis is still unidentified.

Therefore, even when coloration of the sample is confirmed in the second analysis, it is favorable to further perform other analysis for detecting the presence or absence of phthalates. The inventor used experiments to confirm that the Rf value of butyl benzyl phthalate and the Rf value of the other component can be separated by modifying the components of the developing solvent. According to the modification, when the sample is colored in the second analysis, it can be determined with high accuracy whether or not the sample really includes butyl benzyl phthalate by performing the additional first analysis.

To increase the detection accuracy of butyl benzyl phthalate, it is favorable for the developing solvent of the initial thin-layer chromatography to include acetonitrile, and for the developing solvent of the additional thin-layer chromatography to include methanol. A reversed-phase plate is used when the developing solvent includes methanol. Instead of methanol, the developing solvent may include ethyl acetate and hexane in the additional thin-layer chromatography. A normal-phase plate is used when the developing solvent includes ethyl acetate and hexane.

In the analysis method AM2, as long as the components of the developing solvents used in the initial thin-layer chromatography and the additional thin-layer chromatography are different from each other, the components can be selected from the group consisting of acetonitrile, methanol, ethyl acetate, and hexane. More favorably, acetonitrile is used as the developing solvent in the initial thin-layer chromatography. At least one selected from the group consisting of methanol, ethyl acetate, and hexane is used as the developing solvent in the additional thin-layer chromatography. By using acetonitrile and the reversed-phase plate in the initial thin-layer chromatography, the resolution of the phthalates can be greater than that of other developing solvent and plate combinations. Also, when the concentration of the phthalates included in the sample is high, other developing solvent and plate combinations may cause spot deformation. According to the combination of acetonitrile and the reversed-phase plate, spot deformation can be suppressed even when the concentration of the phthalates included in the sample is high. Therefore, it can be determined with higher accuracy whether or not the sample may include phthalates.

Second Embodiment

Figure 10:
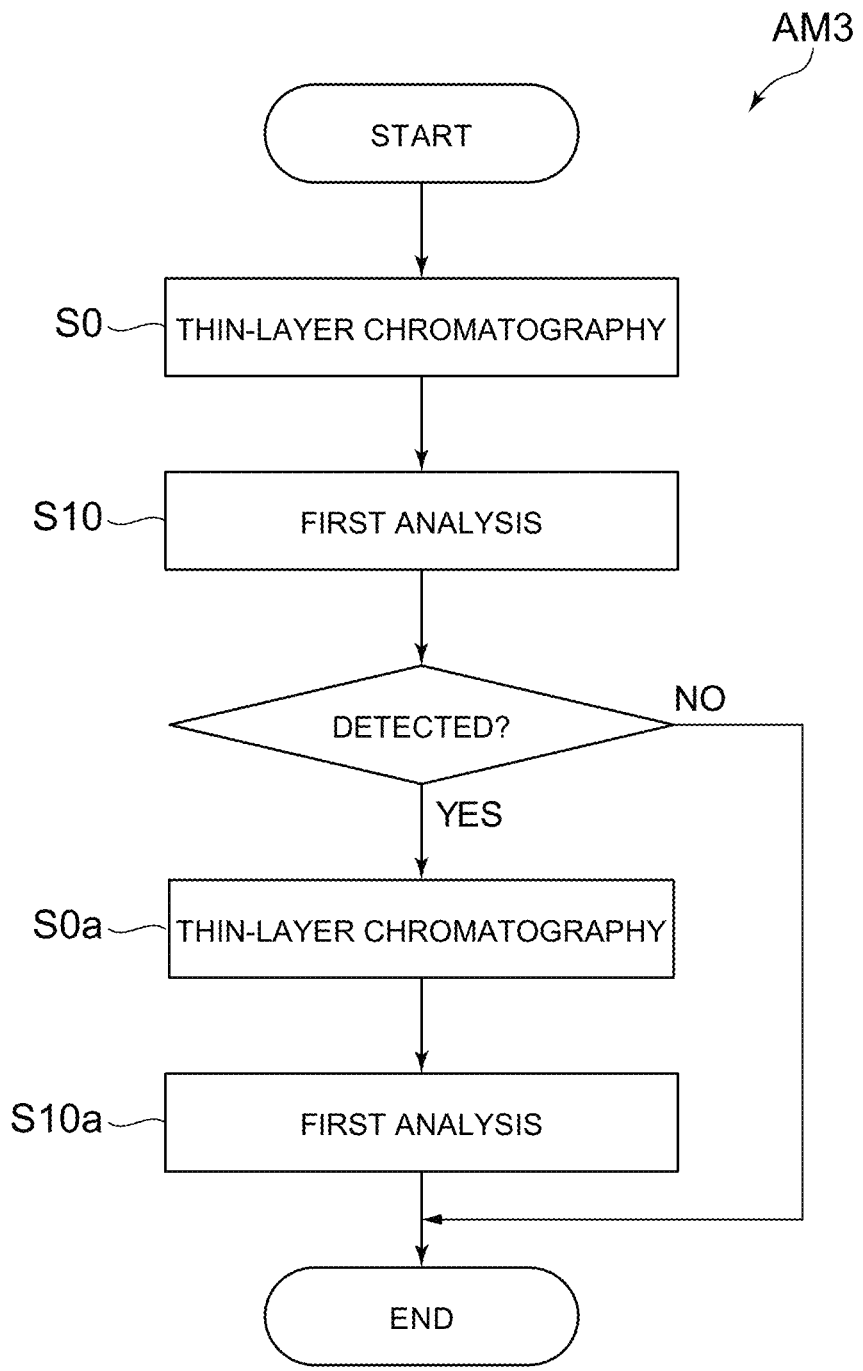
FIG. 10 is a flowchart showing an analysis method according to a second embodiment.

FIG. 10 is a flowchart showing an analysis method according to a second embodiment.

The analysis method AM3 according to the second embodiment includes the thin-layer chromatography (step S0), the first analysis (step S10), the thin-layer chromatography (step S0a), and the first analysis (step S10a). In the analysis method AM3, the additional thin-layer chromatography and the additional first analysis are performed when a component having the same Rf value as a phthalate is detected in the initial first analysis. Hereinafter, in the first analysis, "a component having the same Rf value as a phthalate is detected" also is described as simply "a phthalate is detected".

Similarly to the initial thin-layer chromatography, the additional thin-layer chromatography is performed according to the procedure shown in FIG. 2. The sample that is used in the initial thin-layer chromatography is used in the additional thin-layer chromatography. Another sample may be prepared for the additional thin-layer chromatography. However, the components of the sample developed in the additional thin-layer chromatography are the same as the components of the sample developed in the initial thin-layer chromatography.

A component of the second developing solvent used in the additional thin-layer chromatography is different from a component of the first developing solvent used in the initial thin-layer chromatography. For example, the first developing solvent includes at least one selected from the group consisting of acetonitrile, methanol, ethyl acetate, and hexane. The second developing solvent includes at least one other selected from the group.

The polarity of the second plate used in the additional thin-layer chromatography may be different from the polarity of the first plate used in the initial thin-layer chromatography. For example, the first plate is a reversed-phase plate of low polarity. The second plate is a normal-phase plate of high polarity.

Similarly to the initial first analysis, the additional first analysis is performed according to the procedure shown in FIG. 3. It is determined whether or not the sample includes phthalates based on the Rf values determined from the spots. Specifically, the plasticizer is determined not to include the restricted components when the Rf values of the spots do not match the Rf value of any of the phthalates. The plasticizer is determined to possibly include the restricted components when the Rf values of the spots match the Rf value of any of the phthalates.

After inventing the first embodiment, the inventor of the application obtained the following new knowledge by performing further experiments. When the phthalates were not detected in the sample in the first analysis, the results of the gas chromatography or mass spectrometry of the sample also could confirm that the sample was free of phthalates. When butyl benzyl phthalate was detected in the sample in the first analysis, it could not be finalized whether or not the sample included butyl benzyl phthalate as described in the first embodiment. Also, in many cases when dibutyl phthalate, diisobutyl phthalate, or di-2-ethylhexyl phthalate was detected in the sample in the first analysis, the results of the gas chromatography or mass spectrometry of the sample also could confirm that one of the phthalates was included. However, in some cases, a relatively large spot of another Rf value overlapped the Rf value of di-2-ethylhexyl phthalate, and the first analysis could not discriminate whether or not di-2-ethylhexyl phthalate was detected. The detection was treated as the detection of phthalates even when the spot of the other Rf value easily overlapped the Rf value of a phthalate. Also, in some other cases, even though dibutyl phthalate or diisobutyl phthalate was detected in the first analysis, dibutyl phthalate or diisobutyl phthalate was not detected in the sample in the gas chromatography or mass spectrometry.

It is therefore favorable to perform the additional first analysis when butyl benzyl phthalate, dibutyl phthalate, diisobutyl phthalate, or di-2-ethylhexyl phthalate is detected in the first analysis. Based on the experiments performed by the inventor, it was confirmed that the Rf values of the phthalates and the Rf value of the other component can be separated by modifying the components of the developing solvent or the polarity of the plate. According to the second embodiment, by performing the additional first analysis when phthalates are detected in the sample in the first analysis, it can be determined with high accuracy whether or not the sample is actually free of phthalates.

Second Example

Four types of samples 4 to 7 were prepared. The sample 4 included di-2-ethylhexyl phthalate (DEHP) but did not include butyl benzyl phthalate (BBP), dibutyl phthalate (DBP), or diisobutyl phthalate (DIBP). The samples 5 to 7 did not include butyl benzyl phthalate, dibutyl phthalate, diisobutyl phthalate, or di-2-ethylhexyl phthalate. The components of the samples 5 to 7 were different from each other.

FIGS. 11 and 12 are tables showing analysis results of the second example.

For the samples 4 to 7, the existence or absence of detection was verified while changing the type of the plate, the components of the developing solvent, and the detection method. FIGS. 11 and 12 show the results of some of the experiments. Two types of plates were used, i.e., "reversed phase" and "normal phase". Four types of developing solvents were prepared, i.e., "acetonitrile", "methanol", a mixed solvent of "ethyl acetate" and "hexane", and a mixed solvent of "acetonitrile" and "methanol". Ethyl acetate and hexane were mixed at a ratio of 1 to 5. Three types of the solvent of acetonitrile and methanol were prepared, i.e., a solvent mixed at a ratio of 1 to 5, a solvent mixed at a ratio of 1 to 1, and a solvent mixed at a ratio of 5 to 1. Two types of detection methods were used, i.e., ultraviolet light (UV) in the first analysis and a color reagent in the second analysis. Phosphomolybdic acid ethanol was used as the color reagent.

In the results, "detected" indicates that a spot or coloration was confirmed at the same Rf value as the component of the heading. For di-2-ethylhexyl phthalate (DEHP), "detected (separated)" indicates that the spot of another component appeared at the vicinity of the Rf value of di-2-ethylhexyl phthalate, and the spots were separated from each other. "ND" indicates that a spot or coloration was not confirmed at the same Rf value as the component of the heading. "-" indicates that the color reagent did not react with the component of the heading.

For example, it can be seen from the results of the first analysis of the samples 4 to 6 that butyl benzyl phthalate may be detected even when butyl benzyl phthalate is not included. When butyl benzyl phthalate is detected in the first analysis, the second analysis or the additional first analysis can confirm that the sample does not include butyl benzyl phthalate.

The first analysis of the samples 4 to 6 confirmed that dibutyl phthalate and diisobutyl phthalate were not included. On the other hand, in the first analysis of the sample 7, dibutyl phthalate and diisobutyl phthalate were detected even though the sample 7 did not include dibutyl phthalate of diisobutyl phthalate. The second analysis could not determine whether or not dibutyl phthalate or diisobutyl phthalate were included in the sample because these components did not react with the color reagent. When different developing solvents were used in the first analysis of the sample 7, dibutyl phthalate and diisobutyl phthalate were not detected. Thereby, it could be determined that the sample 7 did not include dibutyl phthalate or diisobutyl phthalate.

Di-2-ethylhexyl phthalate was detected in the first analysis of the sample 4. However, another large spot appeared at the vicinity of the Rf value of di-2-ethylhexyl phthalate, and it could not be determined whether or not the sample 4 included di-2-ethylhexyl phthalate. When different developing solvents were used in the first analysis of the sample 4, the spot of di-2-ethylhexyl phthalate and the spot of another component could be separated. Thereby, it could be confirmed that the sample 4 may include di-2-ethylhexyl phthalate.

Figures 13A, 13B, 13C:
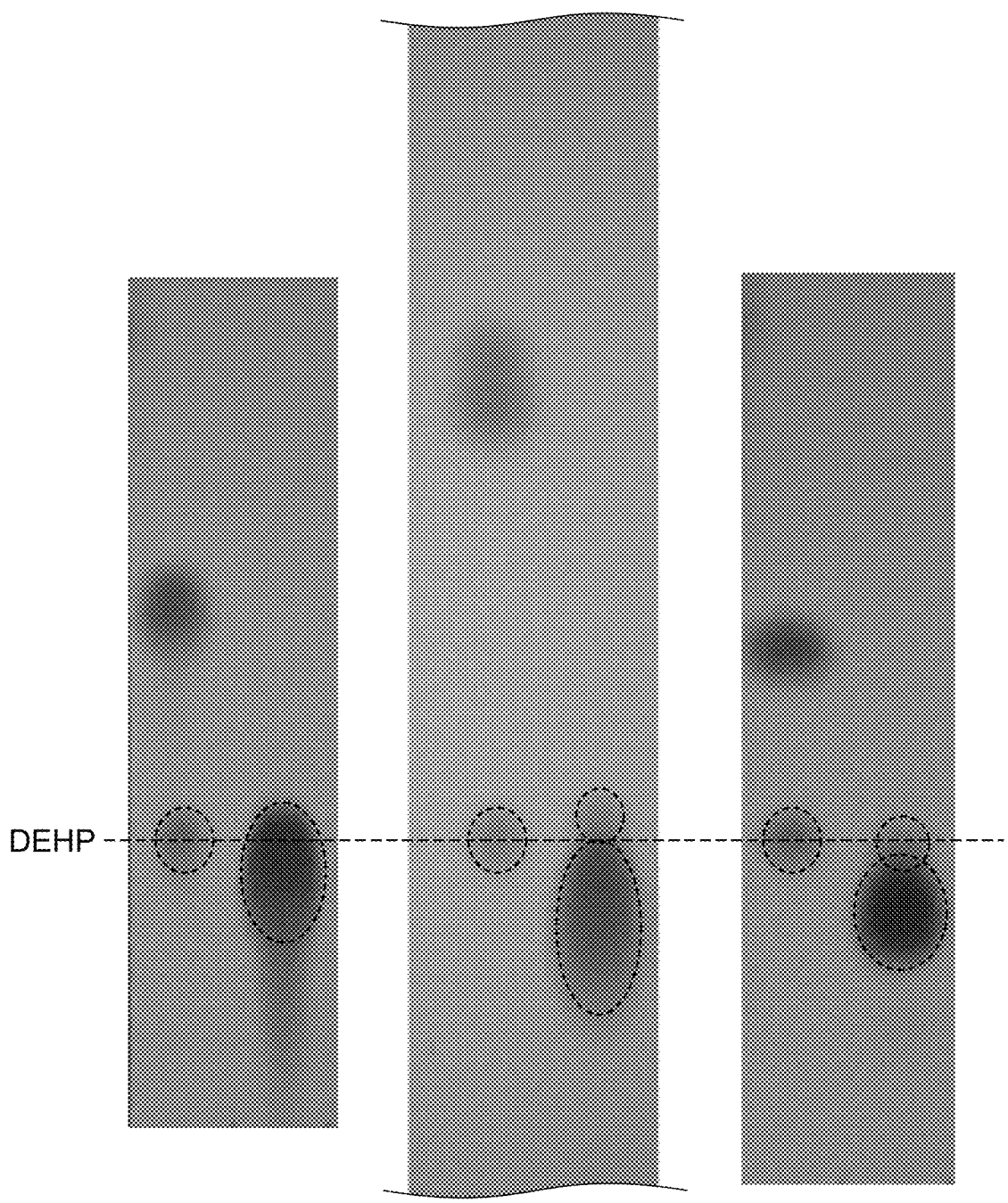
FIGS. 13A to 13C are photographs showing results of the first analysis of the second example.

FIGS. 13A to 13C are photographs showing results of the first analysis of the second example.

In the photographs of FIGS. 13A to 13C, the left side shows the Rf value of di-2-ethylhexyl phthalate (DEHP), i.e., the reference material. The right side shows the result of the first analysis of a sample 8. The sample 8 included di-2-ethylhexyl phthalate and diisononyl phthalate. In the photographs, the spots of di-2-ethylhexyl phthalate and diisononyl phthalate are surrounded with broken lines. In the sample 8, the concentration of di-2-ethylhexyl phthalate was 0.6 wt %. The concentration of diisononyl phthalate was 23 wt %. The concentration of diisononyl phthalate was extremely high compared to the concentration of di-2-ethylhexyl phthalate.

The first analysis shown in FIG. 13A used an acetonitrile developing solvent, a 7.5 cm plate, and a development time of 5 minutes. The first analysis shown in FIG. 13B used an acetonitrile developing solvent, a 20 cm plate, and a development time of 30 minutes. The first analysis shown in FIG. 13C used a methanol developing solvent, a 7.5 cm plate, and a development time of 15 minutes.

In the first analysis shown in FIG. 13A, the spot of diisononyl phthalate overlapped the spot of di-2-ethylhexyl phthalate, and it could not be determined whether or not the sample 8 included di-2-ethylhexyl phthalate. Therefore, the sample 8 is treated as including di-2-ethylhexyl phthalate. In the first analysis shown in FIG. 13B, the spot of di-2-ethylhexyl phthalate and the spot of diisononyl phthalate could be separated by increasing the development time. However, the Rf value of di-2-ethylhexyl phthalate was shifted from the Rf value of the reference material. Therefore, this method cannot be used in an analysis in which accuracy of the Rf value is necessary. Also, the analysis efficiency is not good because the development time is long.

By using a different development analysis in the first analysis shown in FIG. 13C, the spot of di-2-ethylhexyl phthalate and the spot of diisononyl phthalate could be separated while suppressing the shift of the Rf value of di-2-ethylhexyl phthalate. Also, the analysis efficiency reduction could be suppressed because the development time of the first analysis shown in FIG. 13C is half of the development time of the first analysis shown in FIG. 13B.

FIG. 14 illustrates a favorable analysis method.

First, a first analysis is performed using an acetonitrile developing solvent and a reversed-phase plate. When butyl benzyl phthalate (BBP) is detected in the sample in the first analysis, a second analysis that uses a color reagent is performed on the plate used in the first analysis. When butyl benzyl phthalate is detected in the second analysis, an additional first analysis that uses a different developing solvent is performed on the sample. Or, when butyl benzyl phthalate is detected in the first analysis, an additional first analysis that uses a different developing solvent is performed without performing the second analysis. In the illustrated example, the additional first analysis that uses methanol or the additional first analysis that uses a mixed solvent of ethyl acetate and hexane is performed.

When the additional first analysis is performed after the first analysis without performing the second analysis, a total of two analyses can determine whether or not there is a possibility that the sample includes butyl benzyl phthalate. On the other hand, when the second analysis is performed after the first analysis, the second analysis can be performed on the plate on which the first analysis was performed. It is unnecessary to perform additional thin-layer chromatography, and the sample can be easily analyzed. For many samples, the combination of the first and second analyses can determine whether or not there is a possibility that the sample includes butyl benzyl phthalate.

When the first analysis detects dibutyl phthalate (DBP), diisobutyl phthalate (DIBP), or di-2-ethylhexyl phthalate (DEHP) in the sample, the additional first analysis that uses a different developing solvent is performed. In the illustrated example, the additional first analysis that uses methanol or the additional first analysis that uses a mixed solvent of ethyl acetate and hexane is performed on a sample that may include dibutyl phthalate or diisobutyl phthalate. The additional first analysis that uses methanol is performed on a sample that may include di-2-ethylhexyl phthalate. It can be determined thereby whether or not the sample possibly includes dibutyl phthalate, diisobutyl phthalate, or di-2-ethylhexyl phthalate.

Favorably, acetonitrile is used as the developing solvent in the initial thin-layer chromatography. At least one selected from the group consisting of methanol, ethyl acetate, and hexane is used as the developing solvent in the additional thin-layer chromatography. By using acetonitrile in the initial thin-layer chromatography, the resolution of the phthalates can be greater than that of another developing solvent and plate combination. When the concentration of phthalates included in the sample is high, other developing solvent and plate combinations may cause spot deformation. The combination of acetonitrile and the reversed-phase plate can suppress spot deformation even when the concentration of phthalates included in the sample is high. Therefore, it can be determined with higher accuracy whether or not the sample may include phthalates.

The inventions according to the embodiments may include the following features.

APPENDIX 1

An analysis method, comprising:
a first analysis detecting a presence or absence of phthalates in a sample by irradiating ultraviolet light on a plate, the sample being developed on the plate by thin-layer chromatography; and
a second analysis detecting a presence or absence of butyl benzyl phthalate in the sample by supplying a color reagent to the plate on which the sample is developed.

APPENDIX 2

The analysis method according to Appendix 1, wherein the second analysis is performed after the first analysis.

APPENDIX 3

The analysis method according to Appendix 2, wherein
the second analysis is performed when a component having a same Rf value as butyl benzyl phthalate is detected in the first analysis, and
the second analysis is not performed when a component having the same Rf value is not detected in the first analysis.

APPENDIX 4

The analysis method according to any one of Appendixes 1 to 3, wherein
the second analysis is performed for the plate for which the first analysis is performed.

APPENDIX 5

The analysis method according to any one of Appendixes 1 to 4, wherein
the color reagent includes phosphomolybdic acid ethanol, cerium-ammonium molybdate, or vanillin ethanol.

APPENDIX 6

The analysis method according to any one of Appendixes 1 to 5, wherein an other first analysis is further performed when the sample is colored in the second analysis, and a component of a developing solvent used in the other first analysis is different from a component of a developing solvent used in the first analysis.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. An analysis method, comprising:
a first analysis detecting a presence or absence of phthalates in a sample by irradiating ultraviolet light on a plate, the sample being developed on the plate by thin-layer chromatography; and
a second analysis detecting a presence or absence of butyl benzyl phthalate in the sample by supplying a color reagent to the plate on which the sample is developed.

2. The method according to claim 1, wherein
the second analysis is performed after the first analysis.

3. The method according to claim 2, wherein
the second analysis is performed when a component having a same Rf value as butyl benzyl phthalate is detected in the first analysis, and
the second analysis is not performed when a component having the same Rf value is not detected in the first analysis.

4. The method according to claim 1, wherein
the second analysis is performed for the plate for which the first analysis is performed.

5. The method according to claim 1, wherein
the color reagent includes phosphomolybdic acid ethanol, cerium-ammonium molybdate, or vanillin ethanol.

6. The method according to claim 1, wherein
an other first analysis is further performed when the sample is colored in the second analysis, and
a component of a developing solvent used in the other first analysis is different from a component of a developing solvent used in the first analysis.

7. An analysis method, comprising:
performing an analysis detecting a presence or absence of phthalates in a sample by irradiating ultraviolet light on a first plate, the sample being developed on the first plate by thin-layer chromatography using a first developing solvent, and
when a component having a same Rf value as phthalates is detected in the analysis, performing an additional analysis detecting a presence or absence of phthalates in the sample by irradiating ultraviolet light on a second plate,
the sample being developed on the second plate by thin-layer chromatography using a second developing solvent,
a component of the first developing solvent being different from a component of the second developing solvent.

8. The method according to claim 7, wherein
the first developing solvent includes at least one selected from the group consisting of acetonitrile, methanol, ethyl acetate, and hexane, and
the second developing solvent includes at least one other selected from the group.

9. The method according to claim 7, wherein
the first developing solvent includes acetonitrile, and
the second developing solvent includes at least one selected from the group consisting of methanol, ethyl acetate, and hexane.

* * * * *